Oct. 16, 1934.                    D. R. GRIER                    1,977,580
            PACKAGE FOR REVERSIBLE HYDROCOLLOID PLASTIC
                 MATERIAL AND METHOD OF USING THE SAME
                          Filed March 27, 1934
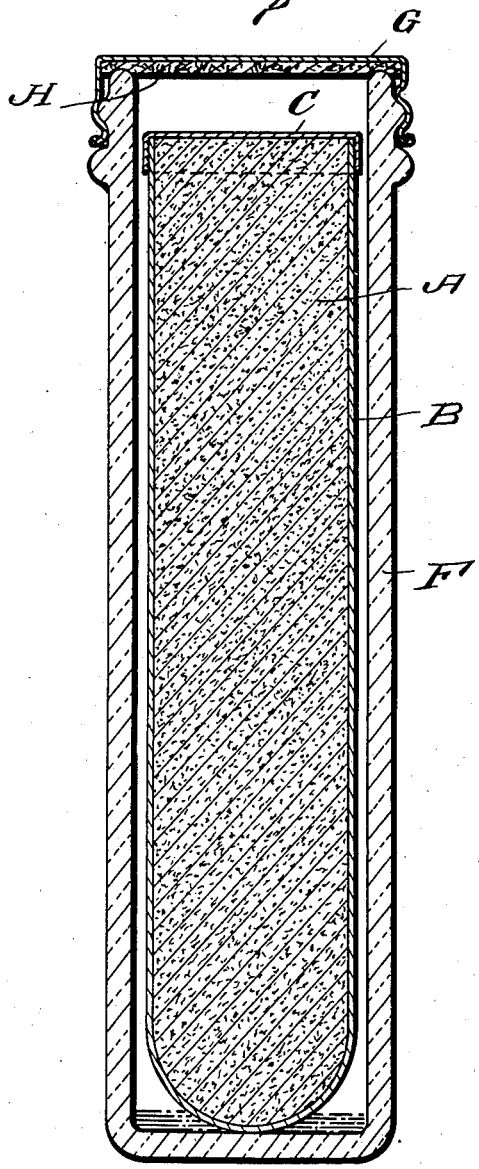
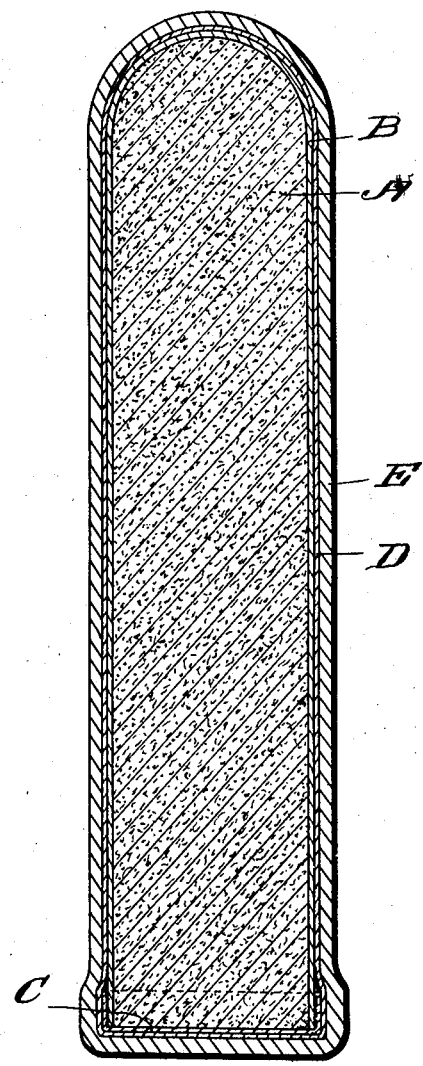
Inventor
Davis R. Grier
Frank C. Skinner
By
Attorney Patented Oct. 16, 1934

1,977,580

UNITED STATES PATENT OFFICE 1,977,580

PACKAGE FOR REVERSIBLE HYDROCOLLOID PLASTIC MATERIAL AND METHOD OF USING THE SAME

Davis R. Grier, Milford, Del., assignor to The L. D. Caulk Company, Milford, Del., a corporation of Delaware Application March 27, 1934, Serial No. 717,653

6 Claims. (Cl. 206—46)

The specific composition of the elastic material forms no part of the present invention as it is known to the trade as "Dentocoll" and has already been covered in U. S. Patent #1,672,776 and is in use for taking impressions in the mouth for dental work and also for forming moulds in plastic surgery. It is what is known as a "Reversible hydro-colloid" which means that it can be heated to a jelly-like consistency, cooled slowly and then reheated, if necessary, without reducing its impression-holding qualities. It has two physical characteristics which are controlling in the construction of the package and the method of using the same, which form the subject of the present invention.

1. It has a high water content which must be maintained or it will become useless for the intended purpose.

2. It is semi-rigid when cool and must be heated to render it fluent and permit it to be kneaded to form a smooth plastic homogeneous mass before using it.

As the material was originally put on the market as a dental plastic, it was extruded from a suitable press in a cylindrical stick and cut into lengths sufficient to provide the proper amount of material to take the impression for forming either an upper or a lower dental plate. These sticks were then wrapped in tin foil and packed in a tin can, the interior wall of which was varnished and lined with paper, after which the cover was sealed with wax.

In using the material the can was opened, a stick was removed and inserted in a special syringe sold with the package. The syringe with its contents was then placed in a special boiler and boiled about four minutes. The mixing plunger of the syringe was worked about twelve times to thoroughly mix the material, which was then in a semi-fluid state, to form a smooth plastic, homogeneous mass. The syringe was cooled to reduce the temperature of the plastic so that it would not burn the mouth and a suitable nozzle was screwed to the syringe through which the material was extruded upon the impression plate.

The original package was found defective in practice for several reasons. When the sealing wax was removed, and the can opened, evaporation of moisture from the plastic material immediately commenced; the can started to rust in spite of the care taken to varnish the walls and to line the can with paper. The loss of water from the plastic caused rapid deterioration of the same and the rust from the can penetrated through the tin foil wrapping and discolored the impression material making it worthless to the purchaser.

The objects of the present invention are,

A. To provide an inexpensive package which is hermetically sealed and convenient for use.

B. To eliminate the danger of contamination by metals, by glue from the former wrapper and by hand wrapping.

C. To eliminate the use of an expensive syringe and special boiler, which have proved to be serious obstacles to the sale and use of the impression material.

D. To simplify the technic for preparing the impression material preliminary to taking an impression.

The structure of the package is clearly shown in the accompanying drawing in which Fig. 1 is a vertical and axial section of one form and Fig. 2 is a similar section of a modified form also embodying the invention. In both figures A is the stick of plastic material; B is a sealed container made of celluloid or similar material and C is a cap or closure of similar material sealed to the container by a suitable celluloid cement. In Fig. 1 F is a glass receptacle having a screw cap G with a filler or packing H to render the same air and moisture proof. In Fig. 2, the celluloid container and its contents are wrapped in wax paper D and the wrapped package is given a coating E of a suitable wax of sufficient thickness to make the package air and moisture proof.

With the above objects in view, I extrude the plastic material from the press directly into a celluloid tube having one open end and preferably an integrally closed end, then sealing the open end by a celluloid cap or plug and a suitable celluloid cement or both ends might be closed by similar caps. This step avoids the necessity of handling the material with the possibility of contaminating the same.

It may be possible to make the container and cap of material other than celluloid but both must be of material which is sufficiently pliable, or becomes so under the action of heat, to permit the container and its contents to be kneaded by the hands of the operator.

It might be expected that the sealing of the plastic in a celluloid tube would be completely effective to prevent any loss of moisture from the plastic but it was found in practice that there was a considerable loss through the walls of the tube and it has been found desirable to enclose the sealed celluloid container in an air and moisture proof covering. In one form of package, I place the celluloid container and its contents in a glass receptacle with a screw cap provided with a wax filling to effect a perfect seal. I have also secured the desired result by wrapping the celluloid container in waxed paper and dipping the wrapped structure in liquid wax to form a coating of sufficient thickness thereon. Owing to the expense of the glass receptacle the latter form will probably be preferred in practice.

When it is desired to use the plastic, it is only necessary to remove the celluloid container from the glass receptacle or, if the waxed paper wrapping is used, to remove the waxed paper and wax from the container by a reverse twisting movement of the hands and then boil the container and its contents in the dentist's sterilizer or an ordinary pan, thus doing away with the special boiler formerly employed when the material was boiled in the syringe. The removal of the waxed paper and its wax covering eliminates the formation of a wax scum when the package is placed in the boiling water. The celluloid tube being transparent any loss of moisture from the plastic can be detected by the appearance of the material and a small quantity of water may be sealed in the tube so that, if necessary, it can be incorporated in the material during the kneading operation. When the glass enclosure is used a small quantity of water may be sealed in the glass tube.

After the celluloid container and its contents have boiled a sufficient time, they are removed from the boiler and wrapped in a towel or other fabric to protect the hands, and the celluloid container, having been softened by boiling, is rendered flexible, thus permitting the material to be thoroughly kneaded and mixed while still in the container. After this, the closed end of the container may be pinched down by the hands and the end clipped off to form a larger or smaller opening through which the material may be extruded onto the impression tray by pressure of the hand upon the flexible celluloid tube.

By reason of the softening of the celluloid container during the boiling of the plastic, the tube and contents may be thoroughly kneaded without the use of the expensive syringe. In the old technic the temperature of the material was tested by touching the syringe against the wrist but in the new method the material is cooled by working it with the hands while immersed in warm water and the temperature may be more readily tested by the hands.

In the new technic, it is unnecessary to varnish the interior of the can in which the material is packed, or to line the same with paper, and contamination due to the rusting of the can and penetration of the rust through the tin foil wrapping is avoided.

Having thus described my invention what I desire to claim is:

1. A package of plastic material comprising a tubular container formed from celluloid or similar material and a stick of semi-rigid "Reversible hydro-colloid" sealed therein by a closure of celluloid or similar material.

2. A hermetically sealed package of plastic material comprising a tubular container formed from celluloid or similar material, integrally closed at one end and open at the other, a stick of semi-rigid "Reversible hydro-colloid" inclosed therein and a closure of celluloid or similar material sealed to the open end of the tube by a suitable cement.

3. A hermetically sealed package of plastic material consisting of a tubular container, formed from celluloid or similar material, integrally closed at one end and open at the other, a stick of semi-rigid "Reversible hydro-colloid" enclosed therein, a closure of celluloid or similar material sealed to the open end of the tube by a suitable cement and an air and moisture proof covering completely enclosing the tubular container.

4. A hermetically sealed package of plastic material consisting of a tubular container, formed from celluloid or similar material, integrally closed at one end and open at the other, a stick of semi-rigid "Reversible hydro-colloid" enclosed therein, a closure of celluloid or similar material sealed to the open end of the tube by a suitable cement, and a glass receptacle completely enclosing the tubular container and sealed with an air and moisture proof closure.

5. A hermetically sealed package of plastic material consisting of a tubular container, formed from celluloid or a similar material integrally closed at one end and open at the other, a stick of semi-rigid "Reversible hydro-colloid" enclosed therein, a closure of celluloid or similar material sealed to the open end of the tube by a suitable cement, a wrapping of waxed paper completely enclosing the container and a coating of suitable wax enveloping the wrapped container.

6. The method of operating upon the package of "Reversible-colloid" covered by claim 3 to prepare the plastic material for use in taking impressions, which consists in removing the inclosing moisture-proof covering, boiling the celluloid container and its contents, without removing the latter, to make the container pliable and reduce the plastic to a semi-liquid consistency and kneading the softened container with its contents, until the material becomes a homogeneous mass and is cooled to the proper temperature for use.

DAVIS R. GRIER.